United States Patent
Kwan et al.

(10) Patent No.: US 12,209,192 B2
(45) Date of Patent: Jan. 28, 2025

(54) OPAQUE INK FORMULATIONS AND ASSOCIATED WRITING INSTRUMENTS

(71) Applicant: Sanford L.P., Atlanta, GA (US)

(72) Inventors: Wing Sum Vincent Kwan, Chicago, IL (US); Marty Sexton, Sugar Grove, IL (US)

(73) Assignee: Sanford, L.P., Atlanta, GA (US)

( * ) Notice: Subject to any disclaimer, the term of this patent is extended or adjusted under 35 U.S.C. 154(b) by 985 days.

(21) Appl. No.: 16/755,936

(22) PCT Filed: Oct. 25, 2018

(86) PCT No.: PCT/US2018/057450
§ 371 (c)(1),
(2) Date: Apr. 14, 2020

(87) PCT Pub. No.: WO2019/084231
PCT Pub. Date: May 2, 2019

(65) Prior Publication Data
US 2020/0255680 A1  Aug. 13, 2020

Related U.S. Application Data

(60) Provisional application No. 62/577,372, filed on Oct. 26, 2017.

(51) Int. Cl.
| | |
|---|---|
| C09D 11/17 | (2014.01) |
| B43K 7/01 | (2006.01) |
| B43K 7/02 | (2006.01) |
| C08K 3/013 | (2018.01) |
| C08K 5/00 | (2006.01) |
| C08L 101/00 | (2006.01) |
| C09D 11/20 | (2006.01) |

(52) U.S. Cl.
CPC ............... *C09D 11/17* (2013.01); *B43K 7/01* (2013.01); *B43K 7/02* (2013.01); *C08K 3/013* (2018.01); *C08K 5/0041* (2013.01); *C08L 101/00* (2013.01); *C09D 11/20* (2013.01)

(58) Field of Classification Search
CPC .......... C09D 11/17; C09D 11/20; C09D 7/20; B43K 7/01; B43K 7/02; C08K 3/013; C08K 5/0041; C08L 101/00
See application file for complete search history.

(56) References Cited

U.S. PATENT DOCUMENTS

| | | | | |
|---|---|---|---|---|
| 4,908,391 A | * | 3/1990 | Melber | C09D 7/68 428/407 |
| 5,288,316 A | | 2/1994 | Auslander et al. | |
| 5,693,127 A | * | 12/1997 | Nigam | C09D 11/36 347/100 |
| 7,655,082 B2 | | 2/2010 | Zhou | |
| 9,109,126 B2 | | 8/2015 | Zhu | |
| 2004/0160500 A1 | * | 8/2004 | Itoh | C09D 11/40 347/100 |
| 2005/0107492 A1 | * | 5/2005 | Sukhna | C09D 11/16 523/160 |
| 2006/0051504 A1 | | 3/2006 | Craig et al. | |
| 2006/0069183 A1 | | 3/2006 | Kurihara | |
| 2009/0023850 A1 | | 1/2009 | Yang et al. | |
| 2010/0063186 A1 | * | 3/2010 | Onyenemezu | C09D 11/17 524/114 |
| 2014/0092168 A1 | * | 4/2014 | Ito | C09D 11/40 106/31.86 |
| 2014/0272141 A1 | * | 9/2014 | Kwan | C09D 11/17 427/256 |
| 2017/0022380 A1 | * | 1/2017 | Nakagawa | C09D 11/033 |

FOREIGN PATENT DOCUMENTS

| | | | | |
|---|---|---|---|---|
| EP | 0980900 A1 | | 2/2000 | |
| EP | 0987304 A1 | | 3/2000 | |
| EP | 3536754 A1 | | 9/2019 | |
| JP | 3605737 B2 | * | 12/2004 | |
| JP | 2015120850 A | * | 7/2015 | |
| JP | 2016193972 A | * | 11/2016 | ........... C09D 11/106 |
| WO | 2000/071629 A1 | | 11/2000 | |
| WO | 2018/200665 A1 | | 11/2018 | |

OTHER PUBLICATIONS

English Machine Translation of JP2016193972A ("Machine_Translation_Tanaka_JP_2016193972_A") (Year: 2016).*
English Machine Translation of JP3605737B2 ("Machine_Translation_Nakamura_JP_3605737_B2") (Year: 2004).*
English Machine Translation of JP2015120850A ("Machine_Translation_Fujii_JP_2015120850_A") (Year: 2015).*
"Gram (g or Gm)." WhatIs, TechTarget, Mar. 2011, www.techtarget.com/whatis/definition/gram-g-or-gm. (Year: 2011).*
Extended European Search report issued in EP Application No. 18870124.7, mailed May 26, 2021 (7 pages).
International Search Report and Written Opinion for International Application No. PCT/US2018/057450 mailed Jan. 17, 2019 (9 pages).
BASF "Joncryl® 74," P&P J74e/01-01-2007/7-9, Jan. 1, 2007 (4 pgs).
CIPO, Canadian Office Action for CA Application No. 3,080,130, mailed Jan. 12, 2024 (5 pages).
CNIPA, China First Office Action for CN Application No. 2018800687000, mailed Dec. 3, 2021 (15 pages).
CNIPA, China Second Office Action for CN Application No. 2018800687000, mailed May 10, 2022 (20 pages).

* cited by examiner

Primary Examiner — Jennifer A Smith
Assistant Examiner — Jeffrey Eugene Barzach
(74) Attorney, Agent, or Firm — Eversheds Sutherland (US) LLP

(57) ABSTRACT

High opacity permanent ink formulations comprising a solvent, a polymer-based opacifier, a coloring agent, a resin, and a humectant, wherein the ink formulation displays a viscosity of less than about 50 cP, are provided herein.

19 Claims, No Drawings

OPAQUE INK FORMULATIONS AND ASSOCIATED WRITING INSTRUMENTS

CROSS-REFERENCE TO RELATED APPLICATIONS

This application is a U.S. national stage application of International Application No. PCT/US2018/057450, filed Oct. 25, 2018, which claims priority to U.S. Provisional Application No. 62/577,372, filed Oct. 26, 2017, the disclosures of which are incorporated herein by reference in their entirety.

FIELD OF THE DISCLOSURE

This disclosure relates generally to ink formulations and associated writing instruments, and more specifically to opaque ink formulations and writing instruments for using the same.

BACKGROUND

Highly opaque inks are desirable for various arts and crafts applications. However, traditional opaque pigments are very small in size and cannot be held on surface of the substrates, especially in desired highly porous surfaces like paper. Consequently, the pigment particles "sink" into the porous substrates and the intended opacity is greatly reduced. Additionally, known water-based formulations with increased opacity do not provide sufficient levels of ink permanence. Thus, it would be desirable to provide a highly opaque ink formulation that can be retained on a substrate surface to provide opacity.

DETAILED DESCRIPTION

Ink formulations having high opacity and writing instruments containing the same are provided. In certain embodiments, the ink formulations described herein display a high level of opacity and are also permanent. As used herein, the term "opaque" or "opacity" refers to a formulation that is substantially impenetrable to visible light when applied to a substrate. That is, an opaque formulation is substantially non-transparent. As used herein, the term "permanent" or "permanence" refers to the ability of the ink formulation to adhere to a variety of media substrates without being removable by simple abrasion. For example, an ink may be considered permanent if a sample of the formulation written on glass, then submerged into water under ambient conditions for twenty-four hours, remains intact, i.e., does not disappear.

In certain embodiments, a high opacity permanent ink formulation contains a solvent, a polymer-based opacifier, and a resin. In some embodiments, the formulation further contains a coloring agent and/or a humectant. In some embodiments, the formulation also contains one or more suitable additives, such as dispersants, surfactants, co-solvents, rheological additives, biocides, and water-based optical brighteners.

In some embodiments, the ink formulation displays a viscosity of less than about 50 cP, such as from about 0.1 cP to about 50 cP. In some embodiments, the ink formulation displays a viscosity of less than about 20 cP, such as from about 0.1 cP to about 20 cP, for example about 0.1 cP, about 0.5 cP, about 1 cP, about 5 cP, about 10 cP, about 15 cP, about 20 cP, or any ranges therebetween. In some embodiments, the ink formulation displays a viscosity of less than about 10 cP, such as from about 0.1 cP to about 10 cP, for example about 0.1 cP, about 0.5 cP, about 1 cP, about 5 cP, about 10 cP, or any ranges therebetween.

For example, the ink composition may contain a polymer-based opacifier to impart opacity, a coloring agent, a resin to impart permanence and adhesion onto non-porous substrates, a humectant, and optionally a dispersant. The ink may have a low viscosity (e.g., less than 50 cP, less than 20 cP, or less than 10 cP) so that it can be fed through a conventional filter reservoir-nib writing instrument system.

In certain embodiments, the ink formulations described herein also display a high surface tension ink to minimize the detrimental penetration into porous substrates. For example, the ink formulations may display a surface tension of from about 30 to about 70 Dynes per meter. This feature may allow the ink to reside mainly on the substrate surface and look the same regardless of the color and porosity of the underlying substrates.

Polymer-Based Opacifiers

To provide opacity, polymer-based opacifying pigments may be used. These pigments may provide partial opacity when they are wet, and achieve full opacity when they are fully deprived of solvents. Moreover, these pigments have been found to be more likely to reside on porous substrates when compared to their inorganic counterparts. Without intending to be bound by a particular theory, it is believed that this is owed to increased particle size and narrow particle size distribution.

In certain embodiments, opacifying pigments will include, but are not limited to, Evoque™ and Ropaque™ series (Ropaque™ Ultra, Ropaque™ Ultra EF, Ropaque™ OP-96, Ropaque™ Dual, etc.) from Dow Chemicals (Michigan, US), Joncryl® 633 from BASF (Germany), Celocor™ and Celocor™ AF from Arkema (Germany), E-cryl 11 from Emulsion Systems (Florida, US), Acusol™ OP301, OP302B, OP303, and OP305 from Rohm and Haas (US), Orgal® OPAC-101 from Organikkimya, WoodPlus PS Opaque by Woodplus (US), Hique 821 (from Huku Lattice) and the like. In certain embodiments, an organic opacifying pigment can be a hybrid between inorganic pigment and organic polymers. Examples include, but are not limited to, Heubach Gmbh (Germany), and the "TA" and "TR" series GREA Company (China).

These opacifers may be low in specific gravity. For example, the opacifiers may have a specific gravity of from about 0.9 to about 1.3 g/cc. Without intending to be bound by a particular theory, it is believed that the low specific gravity provides a more stable ink when compared to non-polymer based alternatives. Such opacifiers have also been discovered to offer great opacity at very low film thickness. For example, it has been discovered that these formulations can provide effective coverage even at about 10 to about 20 micron film thickness.

Solvents

In certain embodiments, the solvent is one that is capable of dissolving the binder resin of the formulation. Applicable solvents can be either protic polar or aprotic polar. Protic polar solvents include, but are not limited to, water, alcohols like methanol, ethanol, n-propanol, iso-propanol, butanol, iso-butanol, pentanol, iso-pentanol, hexanol, iso-hexanol, and the like; and ethers like dipropyleneglycol monoether. Aprotic polar solvents can include, but are not limited to, dimethylsulfoxide, dimethylacetamide, dimethylforamide; formamide; N-methyl pyrrolidinone; N-Methyl morpholine; propylene carbonate; ethylene carbonate; ketones like methylisobutylketone (MIBK) and acetone. But, for the consideration of consumer products, low odor solvents like water and low alcohols may be used.

Coloring Agents

Useful colorants can be a dye or pigment, or a combination thereof. If it is a pigment, the pigment may be first dispersed in an appropriate solvent to become a pigment dispersion prior to addition into the formulation. Examples of such dispersion include, but are not limited to, Tint-Ayd® water-based dispersion line (Elementis), Levanyl series from BASF (Germany), and Hostafine line from Clariant (Germany).

The pigment may also be in a preparation which can be easily dispersed upon contact with the appropriate solvent. Examples of such include, but are not limited to, xFast® and Microlith® line from BASF (Germany), and Agrocer® line from Clariant (Germany). The pigment can also be available in a dispersion form in a liquid like Levanyl® line from Lanxess (Germany), water-based pigment dispersion from Chromatech (Canton, Mich.), CHROMA-CHEM® 896 from Chromaflo (Ashtabula, Ohio) and the like.

Useful colorants also include some dyes. In some embodiments, these dyes may be capable of adhering to the surface of the opacifying particles and provide color even when written on dark color porous substrates. Examples of such dyes include, but are not limited to, Victoria Blue, Basic Red 14, Basic Yellow 49, Basic Red 15, and the like. These dyes can also come in a liquid form as in Fisco Pink 664 and Fisco Blue (Orient USA), and Intrabond Pink BR200) from Sensient (St. Louis, US).

Resins

In certain embodiments, the resin should process one or more the following properties: (a) shows a solubility of at least 5% by weight in the designated solvent; (b) possesses both polar and non-polar domains (i.e., to offer adhesion over various polar and non-polar surfaces) and (c) demonstrates resistance towards abrasion, chemical and other environmental challenges like light, heat and moisture.

Various classes of resins may be used, including but are not limited to, acrylic resin like Joncryl® 67 from BASF (Germany), styrene acrylic resins like Joncryl® 528 or Joncryl® 74A or Joncryl® 2561 or Joncryl® 1568 from BASF (Germany) or Rhoplex™ 2019RX from Dow Chemical (Michigan, US) or Rovene® 6103 from Mallard Creek Polymer (US); vinyl acrylic resins like that from Celanese; vinyl acetate/ethylene (VAE) resin solution from Celanese, and the like.

The molecular weight of the resin can range from at least 500 Daltons to more than 1 million Daltons, depending on the application, the desired resistance level, and final viscosity of the ink desired.

In some embodiments, the resin is a water-based resin. For example, resins like Joncryl® 74 (by BASF) are film-forming and offer early water resistance. These resins may also adhere onto substrates of a diverse surface energy and porosity range, allowing the user to provide permanent arts over a large variety of substrates.

Humectants

In certain embodiments, a humectant may also be included in the formulation to provide an improved cap-off time for the ink. The humectant may also allow the marker to be fully recoverable even when marker is left uncapped for a long time and the ink is dried on the nib. Currently water-based permanent ink does not have this capability. Rather, one of the challenges of using water in a permanence ink formulation is the inability of the ink to resume fluidity after it is dried. It has been found that adding an appropriate humectant into the formulation may help relieve the system from such shortcoming.

Usable humectants include, but are not limited to, simple polyols like propylene glycol and glycerol. Oligomeric and polymeric polyols are also applicable in this application. These are usually polyethers or polyesters. Examples of such alcohols include, but are not limited to, polyethylene glycol, polypropylene glycol, and poly(tetramethylene ether) glycol. An example of such is Pluracol® P series from BASF (Germany) or Voranol™ P400 from Dow Chemicals (Michigan, USA).

In some embodiments, the ink may also contain other additives that are known to the persons in the art. These additives include, but are not limited to, surfactants, co-solvents, rheological additives, biocides, water-based optical brightener, and so on.

Beneficially, the ink formulations described herein may offer high opacity, relative to currently available commercial inks, as well as permanence. It has been discovered that most commercially available pigments that can provide opacity are usually very small and cannot be held on surface of the substrates, especially in desired highly porous surfaces like paper. Consequently, the pigment particles "sink" into the porous substrates and the intended opacity is greatly reduced. Moreover, high permanence is desirable for certain applications. However, most water-based opaque inks do not provide sufficient permanence. Thus, there are two aspects to the identified problem: (i) a need for consistent opacity; and (ii) a need for permanence over a large variety of substrates and media.

To combat the penetration issue for small pigments, some have tried to lay down an abundance of ink to saturate the paper. For example, valve action markers have been used as the mainstream vehicle to deliver such "opaque" ink. However, the disadvantage of such vehicle is that the ink laydown can be inconsistent and messy. The need to re-prime the nib periodically is also disruptive for regular marker users who are accustomed to "uncap and go" usage mentality. Moreover, most commercially available opaque inks are water-based and their adhesion and permanence are subpar.

Thus, in certain embodiments, the present disclose beneficially solves one or more of these issues by providing an ink composition containing a polymer-based opacifier that imparts suitable opacity, a coloring agent, a resin that imparts suitable permanence and adhesion onto non-porous substrates, a humectant, and optionally a dispersant. In some embodiments, the ink formulation is substantially opaque when disposed at a film thickness of 20 microns or less. As used herein, the term "substantially opaque" refers to the formulation, when disposed as a film, having a light transmission of 10 percent or less through the film.

In certain embodiments, writing instruments are also provided. The writing instruments may be any suitable marker or pen type writing instruments that are suitable for housing and delivering the ink formulations described herein. In certain embodiments, a writing instrument is a reservoir-nib system, including a reservoir containing the ink formulation, and a nib in fluid communication with the reservoir, the nib being configured to deliver the ink formulation from the writing instrument.

The following non-limiting examples and comparative examples are given to illustrate certain embodiments of the disclosed ink formulations and should not be used to construe or limit the scope of the disclosure.

EXAMPLES

The ingredients in each example in Table 1 were mixed until a homogenous mixture was achieved. Markers were made with the resulting mixtures. Line intensity of the marker was observed and rated according a visual standard.

TABLE 1

Comparison of Various Formulations in Opacity and Permanence.

| Component | Function | Ex. 1 | Ex. 2 | Ex. 3 | Comparative Ex. 1 | Comparative Ex. 2 |
|---|---|---|---|---|---|---|
| Water | Solvent | 30 | 30 | 35 | 30 | 30 |
| Ropaque OP-96 | Opacifying Polymer | 50 | | | | 50 |
| Celerco AF | Opacifying Polymer | | 50 | 50 | | |
| Rovene 6113 | Non-opacifying Polymer | | | | 50 | |
| Hostafine Red 3S | Red Colorant Dispersant | 10 | 10 | | 10 | 10 |
| Victoria Blue | Blue Colorant | | | 5 | | |
| Joncryl 528 | Binding Resin | 10 | 10 | 10 | 10 | |
| Celvol 523S | Non-Permanent Resin | | | | | 10 |
| | Total | 100 | 100 | 100 | 100 | 100 |
| Opacity of Line on Black Paper (Note 1) | | 5 | 5 | 5 | 2 | 5 |
| Permanence Test (Note 2) | | + | + | + | + | − |

The prepared markers were written on porous black paper. The line opacity was judged visually. A score of 5 means bright, opaque line was observed, whereas a score of 1 means the line was almost invisible.

The markers were also written on glass. The written glass slides were then submerged into water under ambient conditions for twenty-four hours. The resulting marks were compared visually. If the marks are intact, permanence is achieved and a "plus" sign will be listed. Conversely, if the marks disappear, permanence is not achieved and a "minus" sign is noted.

As shown in Table 1, both an opaque polymer and a permanent resin were needed to achieve an opaque and permanent formulation. The experimental ink formulations each displayed bright opacity and permanence.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An opaque permanent ink formulation, comprising:
   a solvent;
   a polymer-based opacifier;
   a coloring agent;
   a styrene acrylic resin; and
   a humectant,
   wherein the polymer-based opacifier has a specific gravity between 0.9 g/cc and 1.3 g/cc and is a hybrid between an inorganic pigment and an organic polymer; and
   wherein the ink formulation displays a viscosity of less than 50 cP.

2. The ink formulation of claim 1, wherein the ink formulation displays a viscosity of less than 20 cP.

3. The ink formulation of claim 1, wherein the ink formulation displays a viscosity of less than 10 cP.

4. The ink formulation of claim 1, wherein the resin shows a solubility of at least 5% by weight in the solvent and possesses both polar and non-polar domains.

5. The ink formulation of claim 1, wherein the resin is a water-based resin.

6. The ink formulation of claim 1, wherein the solvent and resin are selected such that the solvent is capable of dissolving the resin.

7. The ink formulation of claim 1, wherein the solvent is protic polar or aprotic polar.

8. The ink formulation of claim 1, wherein the solvent is selected from water, alcohols, ethers, and acetone.

9. The ink formulation of claim 1, wherein the coloring agent is a dye or pigment.

10. The ink formulation of claim 9, wherein the coloring agent is a pigment provided in the form of a dispersion in a solvent prior to addition to the formulation.

11. The ink formulation of claim 9, wherein the coloring agent is a dye capable of adhering to a surface of the polymer-based opacifier particles.

12. The ink formulation of claim 1, wherein the humectant is selected from simple polyols, oligomeric and polymeric polyols, polyethylene glycol, polypropylene glycol, and poly (tetramethylene ether) glycol.

13. The ink formulation of claim 1, further comprising one or more additives selected from dispersants, surfactants, co-solvents, rheological additives, biocides, and water-based optical brighteners.

14. The ink formulation of claim 1, wherein the ink formulation is substantially opaque when disposed at a film thickness of 20 microns or less.

15. An opaque permanent ink formulation, comprising:
   a solvent comprising water;
   a polymer-based opacifier;
   a coloring agent;
   a permanent ink resin; and
   a humectant,
   wherein the polymer-based opacifier has a specific gravity between 0.9 g/cc and 1.3 g/cc and is a hybrid between an inorganic pigment and an organic polymer;
   wherein the ink formulation displays a viscosity of less than 50 cP; and
   wherein the permanent ink resin is a styrene acrylic resin.

16. A writing instrument comprising the ink formulation of claim 15.

17. The writing instrument of claim 16, further comprising:
 a reservoir containing the ink formulation; and
 a nib in fluid communication with the reservoir, the nib being configured to deliver the ink formulation from the writing instrument.

18. The ink formulation of claim 15, wherein the ink formulation displays a viscosity of less than 20 cP.

19. The ink formulation of claim 15, wherein the ink formulation displays a viscosity of less than 10 cP.

* * * * *